United States Patent [19]

Orliaguet et al.

[11] 4,242,852
[45] Jan. 6, 1981

[54] DEVICE FOR CONDITIONING AND PRESERVING IN VACUO PLASTIC-WRAPPED STERILIZED PRODUCTS, NOTABLY LINEN, IN AN AUTOCLAVE

[75] Inventors: Maurice Orliaguet, Sucy en Brie; Christian F. Colas, Neuilly sur Seine, both of France

[73] Assignee: M A J, Societe a Responsabilite Limitee, Pantin, France

[21] Appl. No.: 19,085

[22] Filed: Mar. 9, 1979

[30] Foreign Application Priority Data

Mar. 13, 1978 [FR] France ................ 78 07107

[51] Int. Cl.³ .................. B65B 31/02; B65B 55/06
[52] U.S. Cl. ............................ 53/89; 53/167; 422/297
[58] Field of Search .......... 53/86, 89, 425, 167, 53/91, 92, 93; 422/297, 300, 302

[56] References Cited

U.S. PATENT DOCUMENTS

| | | | |
|---|---|---|---|
| 2,075,054 | 3/1937 | Podel | 53/89 X |
| 3,925,961 | 12/1975 | Orliaguet | 53/89 |
| 3,991,543 | 11/1976 | Shaw | 53/86 X |

Primary Examiner—Travis S. McGehee

[57] ABSTRACT

Device for packaging and preserving sterilized products under vacuum in plastic packs, in particular linen, in an autoclave, comprising at least one support-rack, a plurality of parallel bars supported by said rack, a plurality of packs in the form of air-impervious plastic bags open at one end, means for supporting the packs in the support-rack with the open ends of said packs extending between adjacent bar of said plurality of parallel bars, and member for compressing and sealing the open ends of the packs fixed to the parallel bars. Said bars are rigidly secured to the support-rack so as to provide between the compressing and sealing members slots of predetermined width open at at least one of their ends, and the pack supporting means comprises at least one auxiliary parallelipipedical rack which can be introduced into and removed from the main support-rack in a direction parallel to the longitudinal directin of the slots.

8 Claims, 6 Drawing Figures

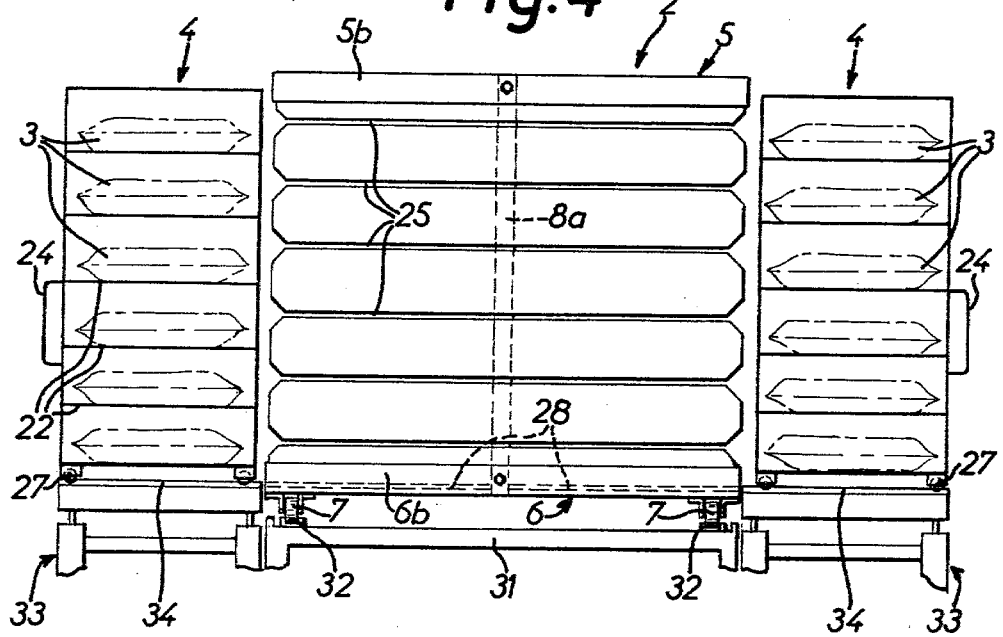
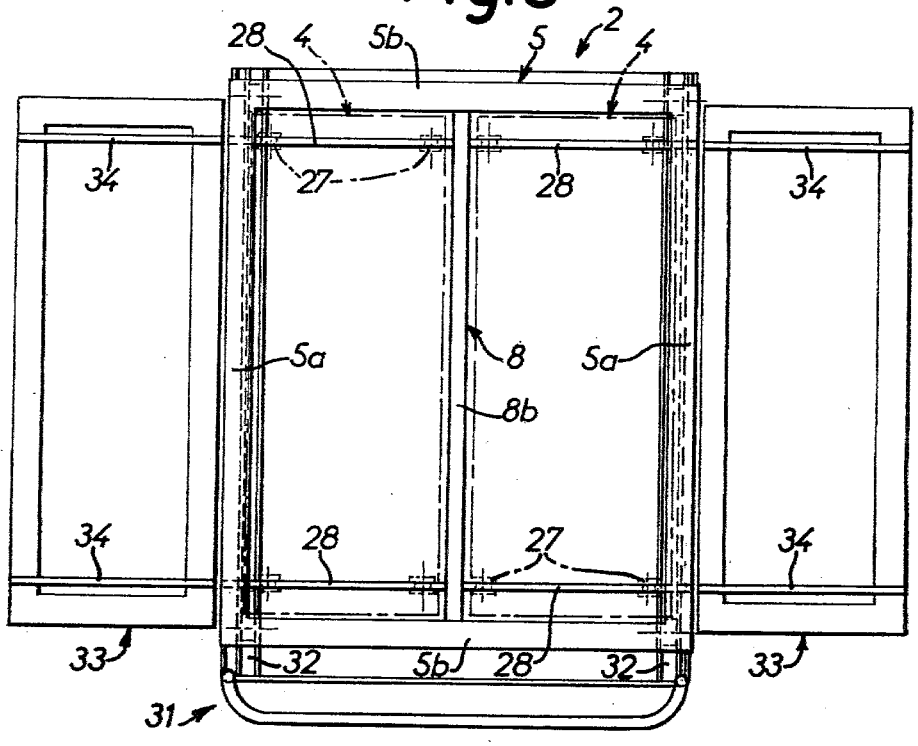

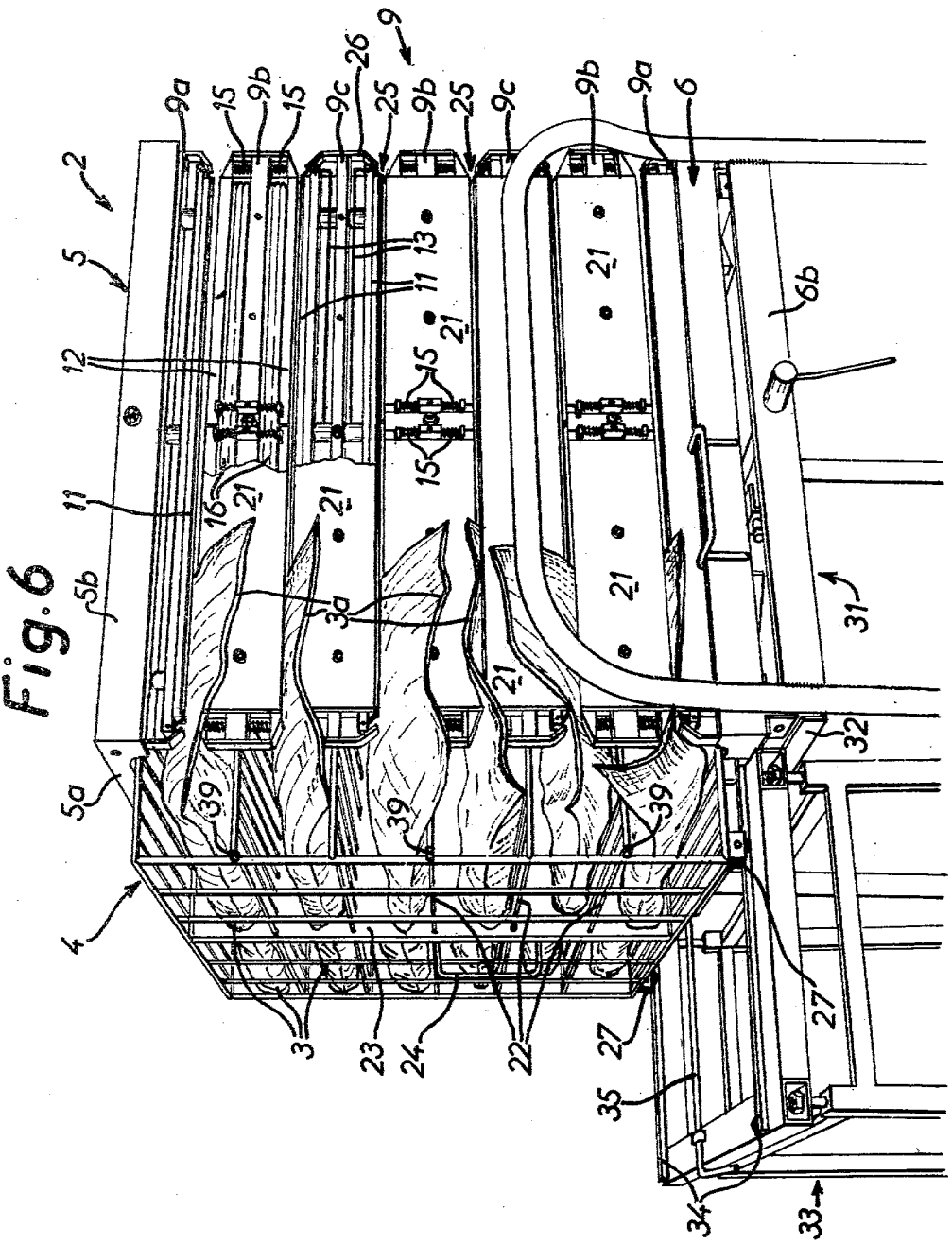

DEVICE FOR CONDITIONING AND PRESERVING IN VACUO PLASTIC-WRAPPED STERILIZED PRODUCTS, NOTABLY LINEN, IN AN AUTOCLAVE

BACKGROUND OF THE INVENTION

1. Field of the Invention

The present invention relates to a device for packaging and preserving sterilized products under vacuum in plastic packs, in particular linen, in an autoclave, comprising at least one support-rack, a plurality of parallel bars supported by said support-rack, a plurality of packs in the form of air-impervious plastic bags open at one end, means for supporting said packs in said support-rack in such a manner that the open end of each pack extends between two adjacent bars of said plurality of parallel bars, and members fixed to said parallel bars for compressing and sealing the open ends of the packs.

2. Description of the Prior Art

A device of the type defined above is disclosed for example in applicant's U.S. Pat. No., 3,925,961. With the known device described in this patent, when the products have been sterilized and conditioned under vacuum in plastic bags in the autoclave and the support-rack has been extracted from the autoclave, it is necessary to wait 15 to 20 minutes before the plastic bags containing the sterilized products can be handled. In fact, when the support-rack is withdrawn from the autoclave, the plastic bags are still at a relatively high temperature. At this temperature, the plastics material constituting the bags is rather brittle and therefore the bags cannot be handled before they have resumed the room temperature, otherwise they might break and this would destroy the vacuum created within the bags. Therefore, the support-rack must be kept still during a time period corresponding to about 30 percent of the total sterilization and conditioning cycle. In order to reduce the total time corresponding to said cycle, one could utilize alternatively two support-racks, one support-rack being loaded with plastic bags containing the products to be sterilized, while the other rack is being processed within the autoclave, said one rack being introduced into the autoclave immediately after the other rack has been removed therefrom. However, the support-racks are relatively expensive items and since the autoclave is capable in general to hold at least two support-racks simultaneouly, it would be necessary to provide at least another pair of such support-racks, so that the cost of the sterilization and conditioning plant would be increased considerably.

In addition, the support-racks described in the above-mentioned U.S. patent comprises a relatively great number of movable component elements exposed to the action of heat and water vapour in the autoclave. More particularly, the bars supporting the compressing and sealing members are not rigidly secured to the support-rack structure but are provided with rollers at their ends, which can roll on rails along the upper longitudinal edges of said rack, so that the bars and associated compressing and sealing member can be moved away from one another to permit the introduction and the removal of the plastic bags into and from adequate baskets supported by the bars. Said bars are themselves interconnected by means of linkage means comprising scissor-type members. Considering the severe conditions to which these component elements are subjected within the autoclave, considerable and therefore expensive maintenance is necessary for the support-rack.

Finally, the plastic bags containing the products to be sterilized are supported in a vertical position in the baskets of the support-rack. As a result, the bags and the products contained therein tend to collapse by gravity and to assume very irregular shapes instead of preserving a substantially flat configuration. This bag deformation is detrimental to the appearance of the final product, and since the bags containing the product under vacuum are relatively rigid, it is difficult to stack them properly for storage purposes.

SUMMARY OF THE INVENTION

It is the primary object of the present invention to avoid the inconveniences set forth above by providing an improved support-rack structure.

To this end, the device according to this invention is characterized in that the parallel bars are rigidly secured to the support-rack so as to form slots of predetermined width open at at least one end between adjacent compressing and sealing members, and in that said pack supporing means comprise at least one auxiliary parallelipipedical rack which can be introduced into and removed from the main support-rack in a direction parallel to the longitudinal direction of said slots at the open ends thereof.

With this arrangement, immediately after the main support-rack has been removed from the autoclave, the auxiliary rack or racks supporting the plastic bags containing the freshly sterilized products can be extracted from the main support-rack without any risk of damaging the bags, and replaced by other auxiliary racks previously loaded with bags containing products to be sterilized. As a result, the main support-rack can be re-introduced immediately into the autoclave for accomplishing the next-sterilization and dconditioning cycle. During said next cycle, the bags containing the products sterilized during the preceding cycle are allowed to cool during the necessary time, and then removed from the auxiliary rack or racks and replaced by other bags containing products to be sterilized, so that the auxiliary rack or racks are ready to be introduced again into the main support-rack for a subsequent sterilization and conditioning cycle. This procedure eliminates losses of time. The auxiliary racks may be made very simply and at a low cost from rigid welded metal rods. Therefore, the fact of providing additional auxiliary racks will not increase appreciably the total cost of the sterilization and conditioning plant.

According to a preferred embodiment of the present invention, the parallel bars supporting the compressing and sealing members may be so fastened as to extend horizontally in superposed relationship on two opposite vertical sides of the main support-rack, and the auxiliary rack or racks may be adapted to support the plastic bags in a horizontal position. Thus, any collapse or setting of the plastic bags and of the products contained therein, as observed when the bags are supported in a vertical position, is safely avoided.

BRIEF DESCRIPTION OF THE DRAWINGS

FIG. 4 is a diagrammatic side elevational view of the main support rack illustrated in FIGS. 2 and 3, and also shows one portion of the carriage supporting the main support-rack, together with two auxiliary racks ready to be introduced into the main support-rack.

FIG. 5 is a plane view from above corresponding to FIG. 4, except that the auxiliary racks are shown in dot and dash lines inside the main support-rack, and FIG. 6 is a perspective view showing an auxiliary rack being introduced into the main support-rack.

DESCRIPTION OF THE PREFERRED EMBODIMENT

Figure 1:
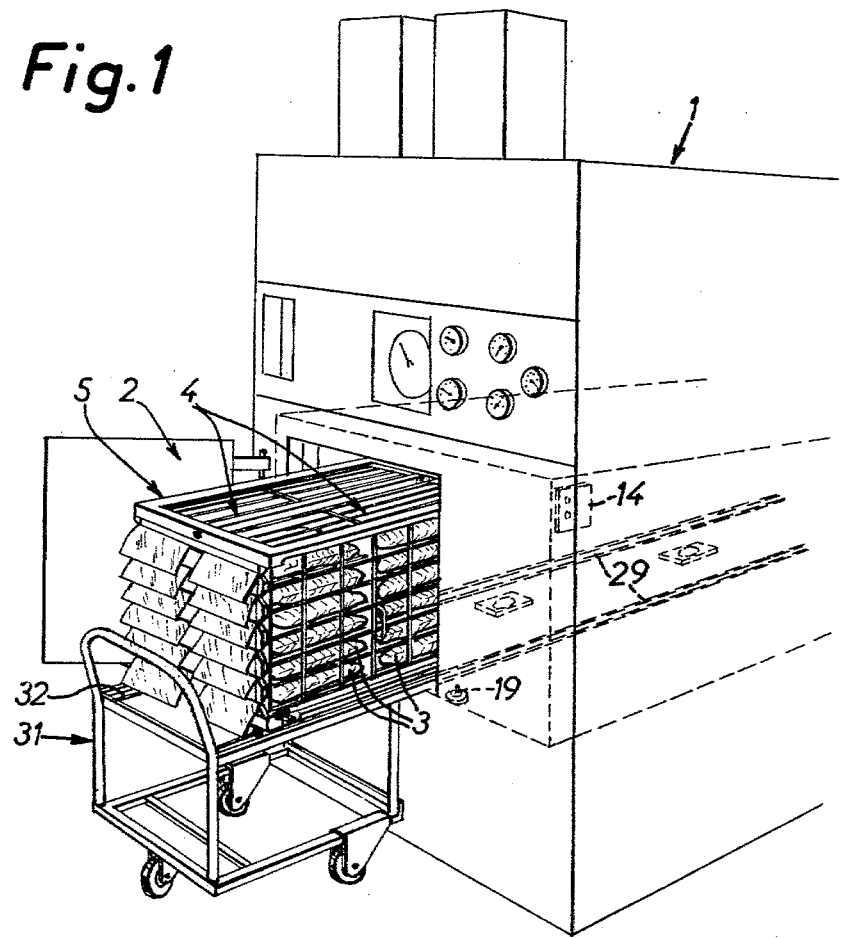
FIG. 1 is a perspective view of an autoclave ready to receive a main support-rack filled for example with linen articles inserted into their individual packs and stacked in two auxiliary racks.

FIG. 1 shows an autoclave 1 ready to receive a main support-rack 2 filled with linen articles inserted into their individual packs 3 and stacked in two auxiliary racks 4.

Figure 2:
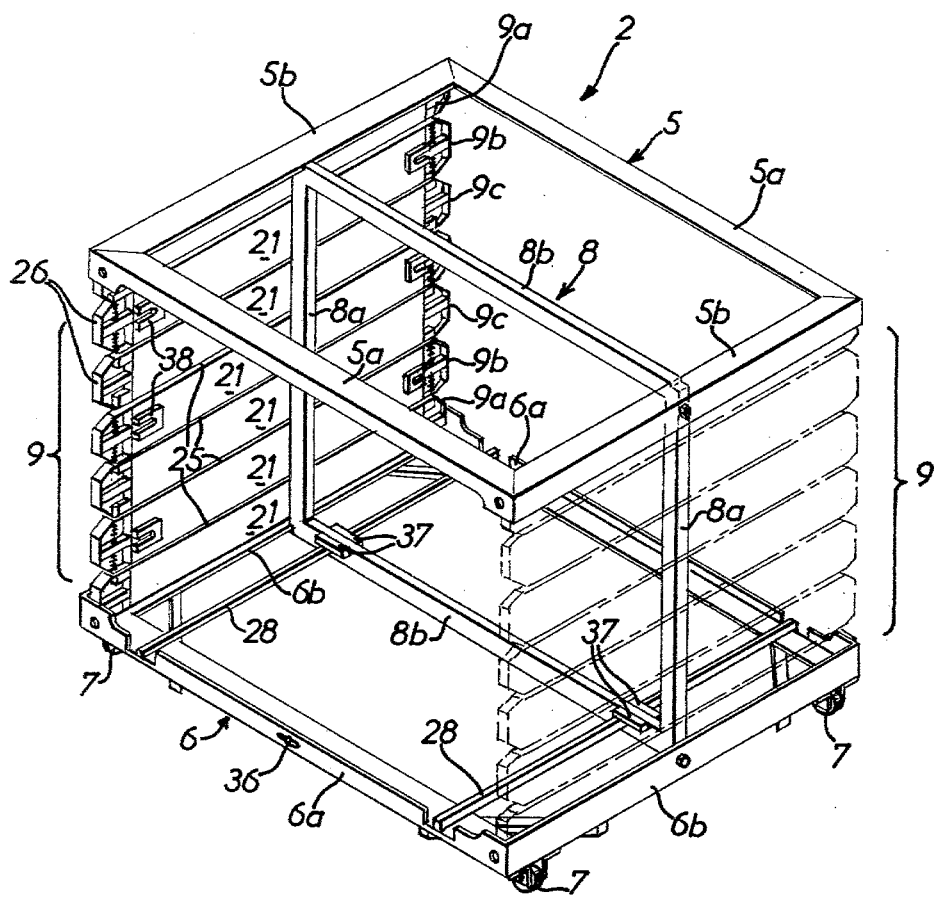
FIG. 2 is a perspective view of the main support-rack shown in FIG. 1, some of the element of said rack having been removed for the sake of clarity.

As bestly shown in FIG. 2, the main support-rack 2 has a frame structure comprising an upper horizontal rectangular frame 5, a lower horizontal rectangular frame 6 provided with rollers 7 to facilitate the introduction of the main support-rack 2 into the autoclave 1, and a single vertical rectangular frame 8. Each one of the two frames 5 and 6 comprises two longitudinal members 5a and 6a, respectively, and two transverse members 5b and 6b, respectively, consisting of metal L-sections. The frame 8 comprises two vertical members 8a and two horizontal members 8b bracing the transverse members 5b and 6b of frames 5 and 6 intermediate their ends.

Two groups of parallel bars 9 are rigidly secured to two opposite vertical sides of the main support-rack 2. More particularly, the bars 9 of each group, extend parallel to the transverse members 5b and 6b of the upper and lower frames 5 and 6, have substantially the same length as said transverse members (5b and 6b, and are secured at the center thereof, in superposed relationship, to one of the two vertical members 8a of vertical frame 8.

Each group of parallel bars 9 comprises two upper and lower end bars 9a, and, between said end bars, other bars 9b and 9c alternating with each other. Each bar, 9c carries on either side sealing members 11, and each bar 9b carries on either side compressing members 12, each compressing member 12 registering with a sealing member 11, as shown in FIG. 6. Each one of the aforesaid end bars 9a carries a sealing member 11 but on one side only.

The sealing members 11 may consist for example of electric welding resistances mounted on insulating supports rigidly secured to the bars 9a and 9c. Said welding resistances are supplied with electric current through conductors 13 connected to a feed circuit (non shown) common to all the electric welding resistances, said feed circuit being carried by the vertical frame 8. The feed circuit may be connected, via a flexible feeder cable, to an electrical current supply plug 14 disposed internally of the autoclave 1 (see FIG. 1) after the main support-rack 2 has been introduced into the autoclave.

Figure 3:
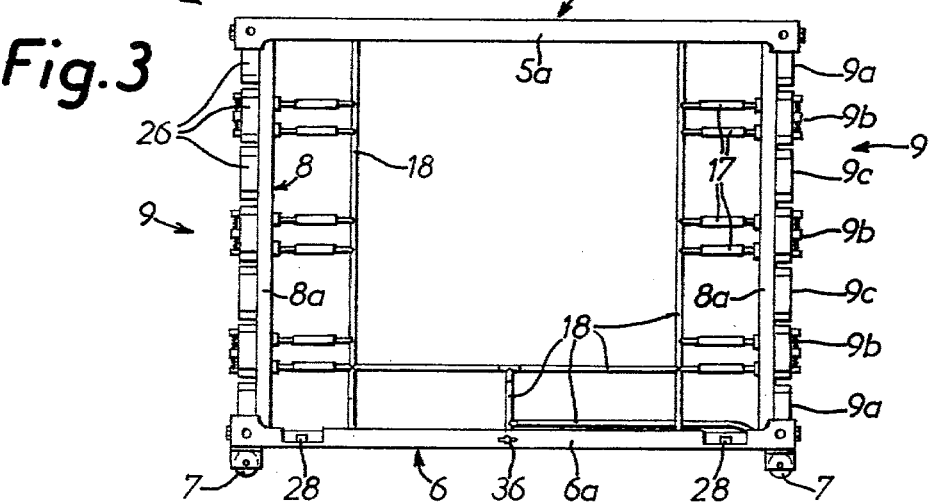
FIG. 3 is a front elevational view of the main supporting rack of FIG. 2.

Each compressing member 12 may consist for example of a pressure plate which is normally urged away from the adjacent electrical welding resistance 11 by traction springs 15, and which can be moved towards said welding resistance 11 by a suitable actuator 16. Actuator 16 may comprise for example an inflatable joint similar to the one described in the aforesaid U.S. Pat. No. 3,925,961. Each inflatable joint 16 is connected via a hose 17 (FIG. 3) to a compressed-air supply circuit 18 which can be connected by means of a flexible conduit or hose (not shown) to a compressed air supply pipe 19 disposed inside the autoclave 1 (FIG. 1), after the main support-rack 2 has been introduced into the autoclave.

Internal and external protecting cover plates 21 (FIGS. 2 and 6) are secured to the bars 9a, 9b and 9c. least the external plates 21 are detachably secured so that an easy access to the sealing members 1 and compressing members 12 can be had after removing said plates.

The individual packs 3 containing the linen articles to be sterilized comprise, in a known manner, air-impervious plastic bags open at one end. The bags 3 are disposed horizontally on trays 22 provided in the auxiliary racks 4. Each auxiliary rack 4 has substantially a parallelipipedical configuration having a length, a width and a height slightly smaller than: the length of the longitudinal members 5a and 6a of frames 5 and 6, half the length of the transverse members 5b and 6b of said frames, and the length of the vertical members 8a of vertical frame 8, respectively. Thus, each auxiliary rack 4 occupies substantially one-half of the inner volume of the main support-rack 2 when the former is introduced into the latter. Each auxiliary rack 4, including its trays 22, may be made from welded metal rods, as shown notably in FIG. 6. A vertical transverse metal partition plate 23 may be provided in the center of each rack 4 for reinforcing same and for acting as an intermediate support for the trays 22. Furthermore, each auxiliary rack 4 is provided preferably with a gripping handle 24.

As already mentioned in the foregoing, the parallel bars 9 are secured only intermediate their ends to the vertical members 8a of vertical frame 8. As a result, slots 25 of predetermined width, open at both ends, are formed between the compressing members 12 and the adjacent sealing members 11, as clearly show, in FIGS. 2, 4 and 6. The bags 3 are disposed horizontally on the trays 22 of auxiliary racks 4. Each tray 22 supports two bags 3 aligned in the longitudinal direction of the auxiliary rack 4 and so disposed that their open ends 3a be oriented in opposite directions and project beyond the vertical transverse end faces of the auxiliary rack 4, respectively, so that they can be engaged into respective slots 25 of the two groups of parallel bars 9, through the open end of slots 25, when introducing the auxiliary rack 4 into the main support-rack, 2, as shown in FIG. 6. Secured to both ends of each bar 9 are guide members 26 (FIG. 2) having a such configuration that they constitute by pairs an outflared inlet for facilitating the introduction of the open ends 3a of bags 3 into the slots 25.

Each auxiliary rack 4 is mounted on four rollers 27 (FIGS. 4, 5 and 6) and the lower frame 6 of the main support-rack 2 is provided with parallel horizontal rails 28 (FIGS. 2 to 6) which extend in a parallel direction to the transverse members 6b of frame 6, so that the auxiliary racks 4 can be properly received and guided. Thus, the auxiliary racks 4 may be introduced and removed into and from the main support-rack 2 in a direction parallel to the longitudinal direction of the slots 25 formed between the parallel bars 9.

As illustrated in FIG. 1, the entrance of the autoclave is located some distance above the floor and parallel horizontal rails 29 are provided in the autoclave for receiving and guiding the main support-rack 2 therein. A carriage 31 (FIGS. 1, 4, 5 and 6) is provided with parallel horizontal rails 32 which can be brought into proper alignment with the rails 29 of the autoclave 1 for receiving and guiding the main support rack 2 at the level of the autoclave entrance. Thus, the main support-rack 2 can easily be brought from a station where the auxiliary racks 4 are loaded thereon to the entrance of the autoclave 1 and introduced into the latter, and alternatively removed from the autoclave 1 and directed to another station where the auxiliary racks 4 are discharged.

At the stations where the auxiliary racks 4 are loaded and/or discharged a pair of fixed auxiliary supports 33 (see FIGS. 4, 5 and 6) are provided and comprise parallel horizontal rails 34 which can be brought in proper alignment with the rails 28 of the lower frame 6 of the main support-rack 2 when the latter is present on the carriage 31. Each fixed support 33 comprises a coupling rod 35 (see FIG. 6) which can be engaged and locked in an aperture 36 (FIGS. 2 and 3) formed in the lower frame 6 of the main support-rack 2 in order to keep the rails 34 in proper alignment with the rails 28.

As shown in FIG. 2, the inward movement of the auxiliary racks 4 into the main supporting rack 2 is limited by stop members 37 secured to the lower horizontal transverse member 8b of vertical frame 8. Moreover, at least some of the parallel bars 9 are provided, at their ends where the slots 25 formed between the compressing members 12 and the sealing members 11 are open, with U-shaped members 38 adapted to be engaged by projecting studs 39 (FIG. 6) rigid with the auxiliary racks 4, in order to stiffen the whole structure and to maintain a constant gap between the parallel bars 9 during the operation of the autoclave.

At the discharge or unloading station the two auxiliary racks 4 may be removed from the main support-rack 2 upon completion of the sterilization and conditioning cycle, and left on the fixed auxiliary supports 33 or be transferred from these supports 33 to another location to allow the bags 33 to cool down. At the loading station, which may be the same station as the unloading or discharge station, another pair of auxiliary racks 4 previously loaded with bags 3 containing linen articles or other articles to be sterilized are introduced into the main support-rack 2 in the place of the pair of auxiliary racks 4 just removed therefrom. Thus, it is possible to reintroduce the main support-rack 2 2 into the autoclave 1 for performing another sterilisation and conditioning cycle without any loss of time. As a result, considerable time savings are made, since it is no more necessary to wait until the bags 3 have cooled sufficiently to permit discharging and reloading the main support-rack 2 and reintroducing it into the autoclave 1.

In addition, since the bags 3 are supported in a horizontal position, said bags 3 and the products contained therein are not prone to collapse, so that at the end of the sterilization and conditioning treatment in the autoclave they preserve a substantially flat configuration facilitating the stacking of the bags at the storage place contemplated. It may further be noted that all the component elements of the main supporting rack 2 are easily accessible, so that their maintenance is greatly facilitated. Another advantage characterizing the main support-rack 2 according to the instant invention is its greater capacity in comparison with the support-rack disclosed in the above-mentioned U.S. Pat. No. 3,925,961. In fact, given equel dimensions, the support-rack described in said U.S. patent is capable of holding twenty bags, whereas the support-rack 2 of the invention can hold 24 bags, corresponding to a 20-percent capacity increment.

In the foregoing, a preferred embodiment of the present invention has been described. However, the parallel bars 9 and the auxiliary racks 4 could be arranged differently without departing from the basic principles of the invention. In fact, the essential requirement is that the parallel bars 9 be rigidly secured to the support-rack so that slot 25 of predetermined width and open at at least one of their ends be formed between the compressing members 12 and the adjacent sealing members 11, and that the auxiliary rack or racks can be introduced into and removed from the main support-rack 2 in a direction parallel to the longitudinal direction of the slots 25 ont the side of the open ends thereof. Finally, it may be pointed out that the carriage 31 and fixed supports 33 are provided only for the reason that the autoclave entrance is located at a certain height above the floor. It is obvious that if said entrance were level with the floor the carriage 31 and the pair of fixed supports 33 could be dispensed with, and in this case the tracks 32 and 34 would be supported directly by the floor itself.

Of course, the above-described embodiment of the invention should not be construed as limiting the scope of the invention, since it is given by way of illustration, not of limitation; thus, many modifications and changes may be brought thereto without departing from the basic principles of the invention as set forth in the appended claims.

What is claimed as new is:

1. In a device for packing and preserving sterilized products under vacuum in plastic packs, in particular linen, in an autoclave, comprising at least one support-rack, a plurality of parallel bars supported by said support-rack forming a structure adapted to receive a plurality of packs in the form of air-impervious plastic bags open at one end, means for supporting said packs in said support-rack in such a manner that the open end of each pack extends between two adjacent bars of said plurality of parallel bars, and members mounted on said parallel bars for compressing and sealing the open ends of said packs, said compressing members being movably mounted on said parallel bars between inoperative and operative positions, the improvement wherein:
   (a) said parallel bars are rigidly secured to said support-rack so as to form slots of predetermined width open at at least one end between adjacent compressing and sealing members; and
   (b) said pack supporting means comprises at least one auxiliary parallelipipedical rack which can be introduced into and removed from said main support-rack in a direction parallel to the longitudinal direction of said slots on the side of the open ends thereof.
   (c) said compressing members are movably mounted on said parallel bars between inoperative and operative positions.

2. A device as claimed in claim 1, wherein said main support-rack comprises an upper rectangular horizontal frame, a lower rectangular horizontal frame provided with rollers for introducing the main support-rack into the autoclave, and a single vertical rectangular frame interconnecting said upper and lower frames, each one of said upper and lower horizontal frames comprising two longitudinal members and two transverse members, and said vertical rectangular frame comprising two vertical members and two horizontal members bracing said transverse members of said upper and lower frames intermediate their ends said plurality of parallel bars comprising two groups of bars, the bars of each group extending parallel to said transverse members of said upper and lower frames, having substantially the same length as said transverse members and being secured intermediate their length, in superposed relationship, to one of the two vertical members of said vertical frame.

3. A device as claimed in claim 2, wherein said pack supporting means comprises two auxiliary parallelipipedical racks having each a length, a width and a height slightly smaller than the length of the longitudinal members of said upper and lower frames, half the length of the transverse members of said upper and lower frames, and the length of said vertical members of said vertical frame, respectively, and having trays disposed horizontally in superposed relationship for supporting said packs.

4. A device as claimed in claim 3, wherein said pack are disposed horizontally on said trays of said auxiliary racks, each tray supporting two packs aligned in the direction of the longitudinal dimension of said auxiliary rack and so disposed that their open ends be oriented in opposite directions and project beyond vertical transverse end faces of said auxiliary rack, respectively.

5. A device as claimed in claim 4, wherein each auxiliary rack is provided with rollers, and the lower horizontal frame of said main support-rack is provided with parallel horizontal rails extending parallel to the transverse members of said lower frame for receiving and guiding said auxiliary racks.

6. A device as claimed in claim 5, comprising parallel horizontal rails in said autoclave for receiving and guiding said main support-rack, a carriage provided with parallel horizontal rails which can be brought into alignment with the rails of said autoclave for receiving and guiding said main support-rack at the level of the entrance of said autoclave, and a pair of fixed frames provided with parallel horizontal rails which can be brought into alignment with the rails of the lower frame of said main support-rack when said main support-rack is disposed on said carriage, for receiving said auxiliary racks.

7. A device as claimed in claim 1, wherein at least some of said parallel bars, at their ends where said slots formed between said compressing and sealing members are open, carry U-shaped members capable of being engaged by studs projecting from and rigid with said auxiliary racks.

8. A device as claimed in claim 2, wherein said vertical frame of said main support-rack supports compressed-air and electric-current supply circuits connected to said compressing and sealing members, respectively, said circuit being connectable to compressed-air and electric-current supply means, respectively, in said autoclave.

* * * * *